(12) United States Patent
Imazawa et al.

(10) Patent No.: US 8,796,899 B2
(45) Date of Patent: Aug. 5, 2014

(54) ROTARY ELECTRIC MACHINE

(75) Inventors: Yoshiro Imazawa, Tokyo (JP);
Kazunori Tanaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 386 days.

(21) Appl. No.: 13/211,802

(22) Filed: Aug. 17, 2011

(65) Prior Publication Data
US 2012/0248922 A1    Oct. 4, 2012

(30) Foreign Application Priority Data

Mar. 30, 2011    (JP) ................. 2011-074316

(51) Int. Cl.
*H02K 3/12* (2006.01)
*H02K 3/28* (2006.01)
(52) U.S. Cl.
CPC ...................... *H02K 3/28* (2013.01)
USPC ........................................... 310/198
(58) Field of Classification Search
None
See application file for complete search history.

(56) References Cited

U.S. PATENT DOCUMENTS

| 1,711,979 A * | 5/1929 | Helmut Weinert | 310/202 |
|---|---|---|---|
| 5,998,903 A * | 12/1999 | Umeda et al. | 310/179 |
| 6,281,610 B1 * | 8/2001 | Kliman et al. | 310/143 |
| 6,424,073 B1 * | 7/2002 | Kometani et al. | 310/263 |
| 6,498,413 B2 * | 12/2002 | Imori et al. | 310/180 |
| 6,552,463 B2 * | 4/2003 | Oohashi et al. | 310/207 |
| 6,614,141 B2 * | 9/2003 | Oohashi et al. | 310/184 |
| 2006/0208594 A1 * | 9/2006 | Kashihara et al. | 310/179 |

FOREIGN PATENT DOCUMENTS

| JP | 57113671 U | 7/1982 |
|---|---|---|
| JP | 2007215341 A | 8/2007 |
| WO | 2005/107040 A1 | 11/2005 |
| WO | 2007088598 A1 | 9/2007 |

OTHER PUBLICATIONS

Japanese Office Action in Japanese Patent Application No. 2011-074316 dated Feb. 12, 2013.

* cited by examiner

*Primary Examiner* — Tran Nguyen
(74) *Attorney, Agent, or Firm* — Sughrue Mion, PLLC; Richard C. Turner

(57) ABSTRACT

The stator winding includes: a first three-phase wye-delta hybrid winding that is configured by connecting phase windings of a first wye winding to respective output ends of a first delta winding; and a second three-phase wye-delta hybrid winding that is configured by connecting phase windings of a second wye winding to respective output ends of a second delta winding. The phase windings of the first and second wye windings are configured by connecting two winding portions in parallel, and those two winding portions are configured such that distributions of radial positions inside slots of conductor wires that constitute the winding portions are equal.

4 Claims, 6 Drawing Sheets

ROTARY ELECTRIC MACHINE

BACKGROUND OF THE INVENTION

1. Field of the Invention

The present invention relates to a rotary electric machine such as an automotive alternator, and particularly relates to a stator winding mounting construction for a stator core in which slots are formed at a ratio of two slots per phase per pole.

2. Description of the Related Art

In conventional rotary electric machines, a stator is formed so as to have a slot count at a ratio of two slots per phase per pole, and an armature winding is constituted by two three-phase wye-delta hybrid windings. Moreover, the three-phase wye-delta hybrid windings include: a delta winding in which three phase windings are delta-connected; and a wye winding that is constituted by three phase windings that are connected to respective output ends of the delta winding.

However, in wye-delta hybrid windings, when only the fundamental wave is considered, an electric current that is $\sqrt{3}$ times the electric current that flows through the phase windings of the delta winding flows through the phase windings of the wye winding. Thus, one problem has been that the density of the electric current that flows through the phase windings of the wye winding and the density of the electric current that flows through the phase windings of the delta winding are different, and temperature distribution in the stator winding is nonuniform.

In order to make the temperature distribution of a stator winding that is constituted by a wye-delta hybrid winding uniform in view of these conditions, it has been proposed that the density of the electric current that flows through the phase windings of the wye winding and the density of the electric current that flows through the phase windings of the delta winding be made equal by freaking the turn count of the phase windings of the wye winding identical to the turn count of the phase windings of the delta winding, and making the cross-sectional area of the conductor wires that constitute the phase windings of the wye winding $\sqrt{3}$ times the cross-sectional area of the conductor wires that constitute the phase windings of the delta winding (see Patent Literature 1, for example).

Patent Literature 1: WO/2005/107040 (Pamphlet: FIG. 6)

Thus, in conventional rotary electric machines according to Patent Literature 1, two kinds of conductor wires that have different cross-sectional areas are used in order to make the temperature distribution of the stator winding uniform. Thus, the rigidity of the two kinds of conductor wires is different, and one problem has been that differences arise in the bendability of the two when the coil ends are bent and shaped, making the coil ends nonuniform. Another problem has been that it is necessary to shape the coils using dedicated tools for each of the two kinds of conductor wires, hindering rationalization of the manufacturing process.

SUMMARY OF THE INVENTION

The present invention aims to solve the above problems and an object of the present invention is to provide a rotary electric machine in which phase windings of a wye winding are configured into parallel circuits to make density of electric current that flows through phase windings of the wye winding and density of electric current that flows through phase windings of a delta winding approximately equal without changing cross-sectional area of the conductor wires, making temperature distribution in a stator winding uniform, improving rationalization of manufacturing processes, and also enabling cyclic current flows in parallel circuit portions of the wye winding to be suppressed.

In order to achieve the above object, according to one aspect of the present invention, there is provided a rotary electric machine including: a rotor that is rotatably supported by a housing; and a stator including: a stator core in which slots are formed at a ratio of two slots per phase per pole; and a first three-phase wye-delta hybrid winding and a second three-phase wye-delta hybrid winding that are mounted into the stator core, the stator being supported by the housing so as to surround the rotor. The first three-phase wye-delta hybrid winding includes: a first delta winding that is configured by delta-connecting a delta-$U_1$-phase winding, a delta-$V_1$-phase winding, and a delta-$W_1$-phase winding; and a first wye winding that is constituted by a wye-$U_1$-phase winding, a wye-$V_1$-phase winding, and a wye-$W_1$-phase winding that are connected to respective output ends of the first delta winding, and the second three-phase wye-delta hybrid winding includes: a second delta winding that is configured by delta-connecting a delta-$U_2$-phase winding, a delta-$V_2$-phase winding, and a delta-$W_2$-phase winding; and a second wye winding that is constituted by a wye-$U_2$-phase winding, a wye-$V_2$-phase winding, and a wye-$W_2$-phase winding that are connected to respective output ends of the second delta winding. In addition, the delta-$U_1$-phase winding and the wye-$U_2$-phase winding are mounted into a first slot group that is constituted by the slots at intervals of six slots; the delta-$U_2$-phase winding and the wye-$U_1$-phase winding are mounted into a second slot group that is constituted by the slots at intervals of six slots; the delta-$V_1$-phase winding and the wye-$V_2$-phase winding are mounted into a third slot group that is constituted by the slots at intervals of six slots; the delta-$V_2$-phase winding and the wye-$V_1$-phase Winding are mounted into a fourth slot group that is constituted by the slots at intervals of six slots; the delta-$W_1$-phase winding and the wye-$W_2$-phase winding are mounted into a fifth slot group that is constituted by the slots at intervals of six slots; and the delta-$W_2$-phase winding and the wye-$W_1$-phase winding are mounted into a sixth slot group that is constituted by the slots at intervals of six slots. The delta-$U_1$-phase winding, the delta-$U_2$-phase winding, the delta-$V_1$-phase winding, the delta-$V_2$-phase winding, the delta-$W_1$-phase winding, the delta-$W_2$-phase winding, the wye-$U_1$-phase winding, the wye-$U_2$-phase winding, the wye-$V_1$-phase winding, the wye-$V_2$-phase winding, the wye-$W_1$-phase winding, and the wye-$W_2$-phase winding are respectively configured by winding conductor wires that have an identical cross-sectional shape into the slots at intervals of six slots. The wye-$U_1$-phase winding, the wye-$U_2$-phase winding, the wye-$V_1$-phase winding, the wye-$V_2$-phase winding, the wye-$W_1$-phase winding, and the wye-$W_2$-phase winding are each configured by connecting two winding portions in parallel, and the two winding portions that are connected in parallel are respectively configured by winding the conductor wires into the slots such that inductances of the two winding portions are close.

According to the present invention, phase windings of first and second delta windings and first and second wye windings are configured using conductor wires that have an identical cross-sectional shape. Thus, coil ends can be bent and shaped into identical shapes, increasing uniformity of the coil ends. The coils can be shaped using a single tool, and are suitable for rationalization of manufacturing processes.

Because the phase windings of the first and second wye windings are configured by connecting two winding portions in parallel, density of electric current that flows through the phase windings of the first and second wye windings can be reduced. Thus, the density of the electric current that flows through the phase windings of the first and second wye windings can be brought closer to the density of the electric current that flows through the phase windings of the first and second delta windings, enabling the temperature distribution of the stator winding to be made uniform.

Because the two winding portions that are connected in parallel are respectively configured by winding conductor wires into the slots such that the inductances of the two winding portions are close, the generation of cyclic currents in parallel circuit portions can be suppressed.

DETAILED DESCRIPTION OF THE PREFERRED EMBODIMENTS

Preferred embodiments of the present invention will now be explained with reference to the drawings.
Embodiment 1

Figure 1:
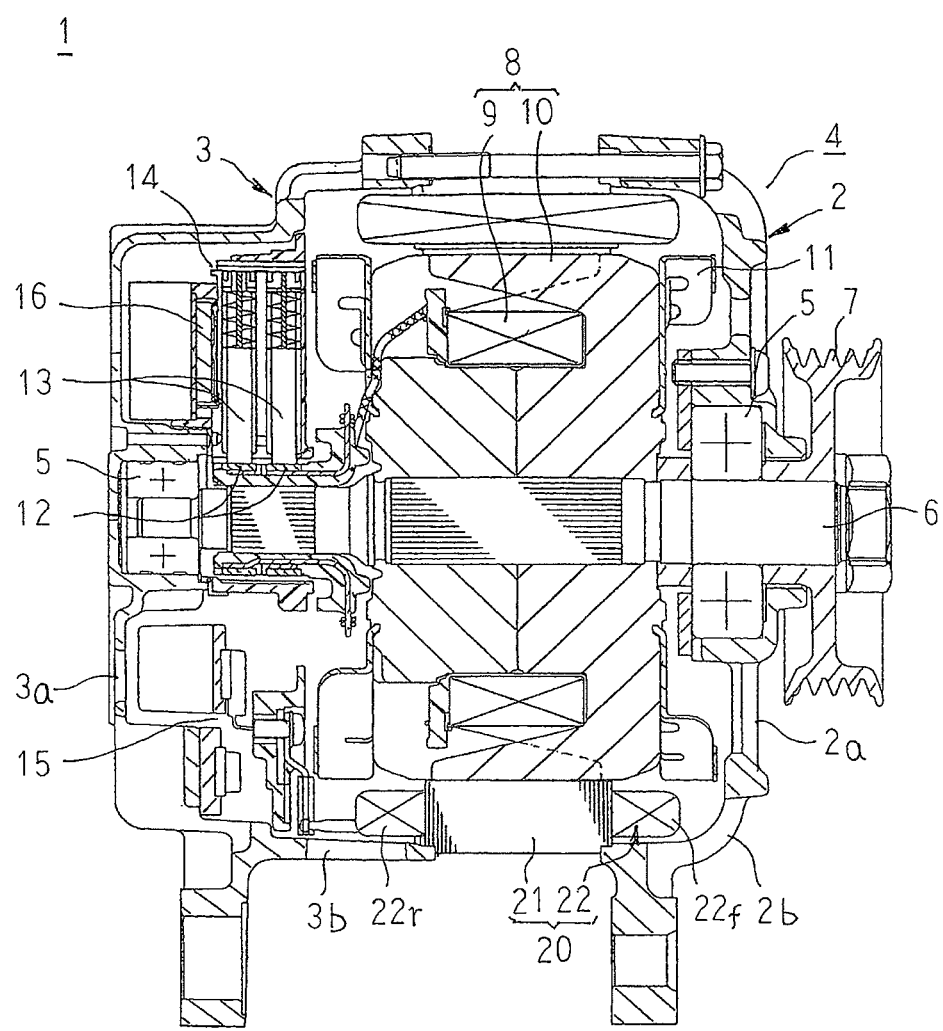
FIG. 1 is a longitudinal cross section that shows an automotive alternator according to Embodiment 1 of the present invention.
Figure 2:
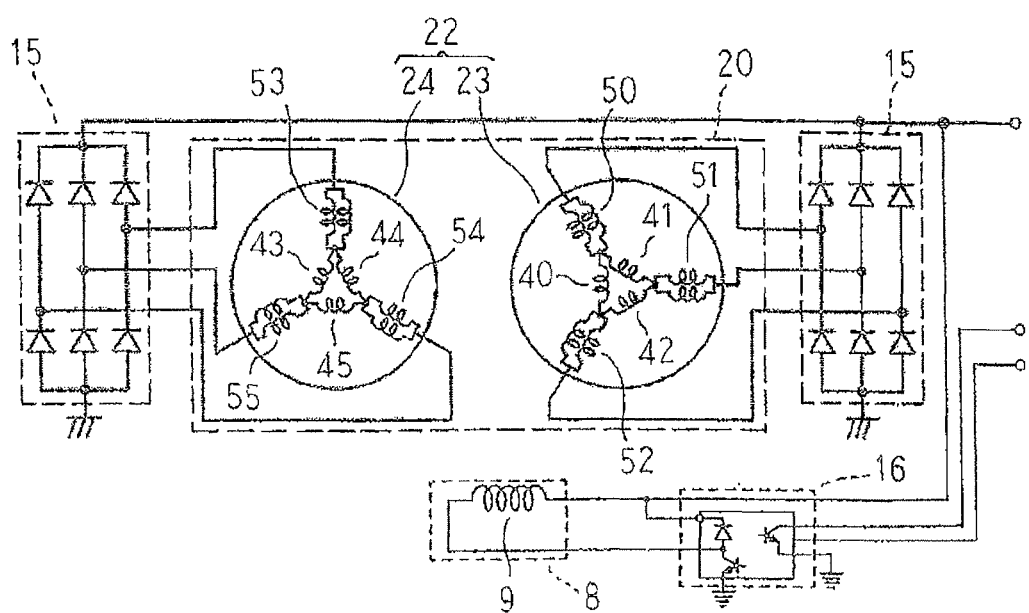
FIG. 2 is an electrical circuit diagram of the automotive alternator according to Embodiment 1 of the present invention.

FIG. 1 is a longitudinal cross section that shows an automotive alternator according to Embodiment 1 of the present invention, and FIG. 2 is an electrical circuit diagram of the automotive alternator according to Embodiment 1 of the present invention.

In FIG. 1, an automotive alternator 1 that functions as a rotary electric machine includes: a housing 4 that is constituted by a front bracket 2 and a rear bracket 3 that are each approximately bowl-shaped and made of aluminum; a shaft 6 that is rotatably supported in the housing 4 by means of bearings 5; a pulley 7 that is fixed to an end portion of the shaft 6 that extends out frontward from the housing 4; a rotor 8 that is fixed to the shaft 6 and that is disposed inside the housing 4; a stator 20 that is fixed to the housing 4 so as to surround the rotor 8; a pair of slip rings 12 that are fixed to a rear end of the shaft 6, and that supply electric current to the rotor 8; a pair of brushes 13 that slide on respective surfaces of the slip rings 12; a brush holder 14 that accommodates the brushes 13; rectifiers 15 that are electrically connected to the stator 20 so as to convert alternating current that is generated by the stator 20 into direct current; and a voltage regulator 16 that is mounted onto the brush holder 14, and that adjusts magnitude of an alternating-current voltage that is generated by the stator 20.

The rotor 8 includes: a field coil 9 that generates magnetic flux on passage of an excitation current; a pole core 10 that is disposed so as to cover the field coil 9, and in which magnetic poles are formed by the magnetic flux; and the shaft 6, which is fitted centrally through the pole core 10. Fans 11 are fixed to two axial end surfaces of the pole core 10 by welding, etc.

The stator 20 is held from two axial ends by the front bracket 2 and the rear bracket 3, and includes: a stator core 21 that is disposed so as to surround the pole core 10 so as to ensure a uniform gap from an outer peripheral surface of the pole core 10 of the rotor 8; and the stator winding 22, which is mounted to the stator core 21.

As shown in FIG. 2, the stator winding 22 is constituted by a first three-phase wye-delta hybrid winding 23 and a second three-phase wye-delta hybrid winding 24.

The first three-phase wye-delta hybrid winding 23 is constituted by: a first delta winding that is configured by delta-connecting a delta-$U_1$-phase winding 40, a delta-$V_1$-phase winding 41, and a delta-$W_1$-phase winding 42; and a first wye winding that is constituted by a wye-$U_1$-phase winding 50, a wye-$V_1$-phase winding 51, and a wye-$W_1$-phase winding 52 that are connected to respective output ends of the first delta winding.

The second three-phase wye-delta hybrid winding 24 is constituted by: a second delta winding that is configured by delta-connecting a delta-$U_2$-phase winding 43, a delta-$V_2$-phase winding 44, and a delta-$W_2$-phase winding 45; and a second wye winding that is constituted by a wye-$U_2$-phase winding 53, a wye-$V_2$-phase winding 54, and a wye-$W_2$-phase winding 55 that are connected to respective output ends of the second delta winding.

Figure 3:
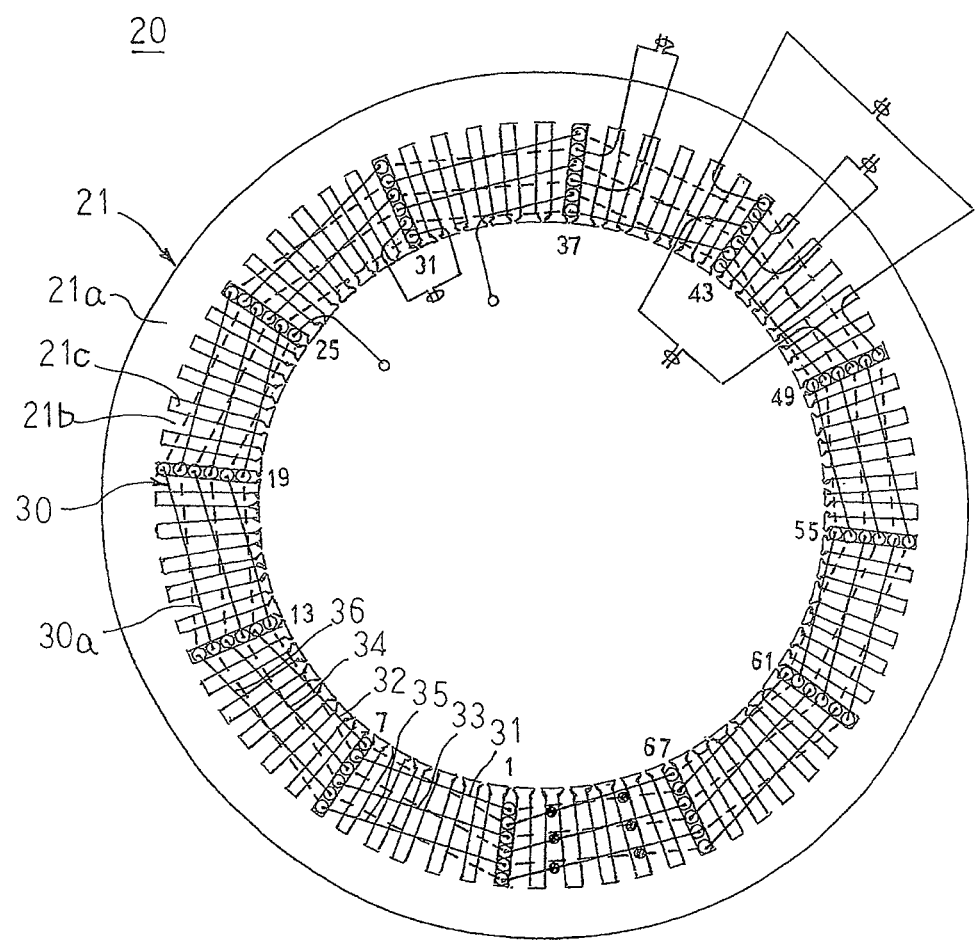
FIG. 3 is a rear-end end elevation that explains a method for mounting conductor wires that are mounted into a first slot group of a stator core that is used in the automotive alternator according to Embodiment 1 of the present invention.
Figure 4:
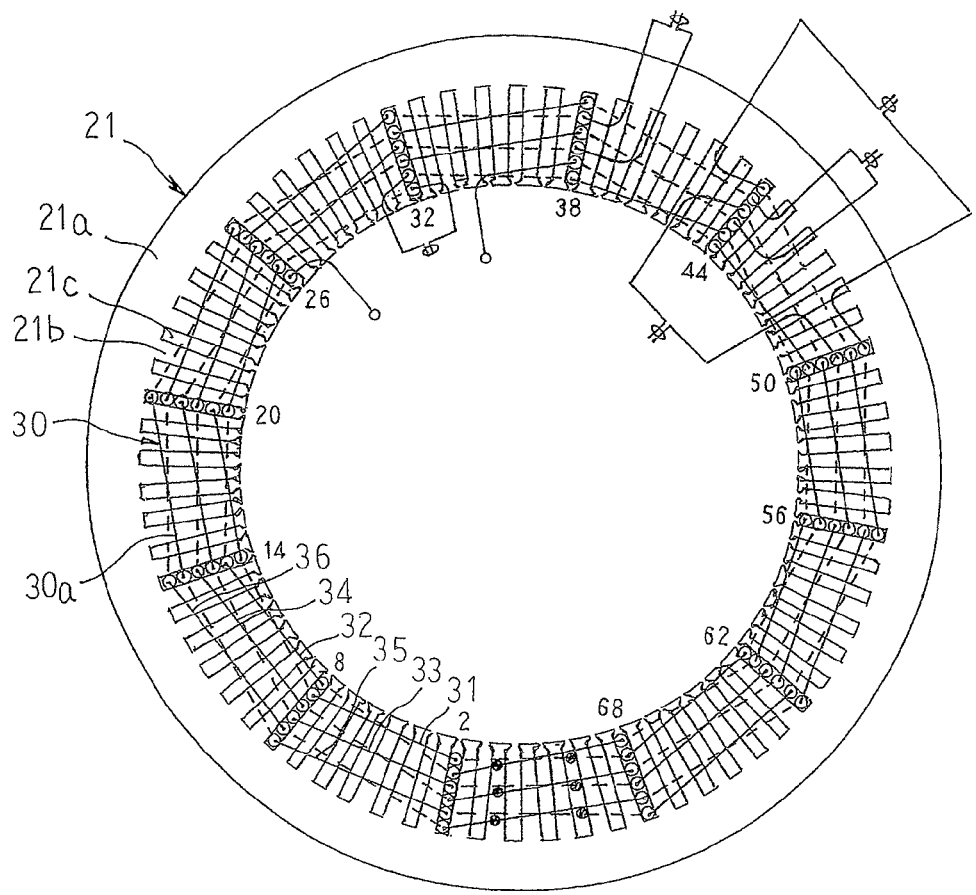
FIG. 4 is a rear-end end elevation that explains a method for mounting conductor wires that are mounted into a second slot group of the stator core that is used in the automotive alternator according to Embodiment 1 of the present invention.

Next, constructions of the delta-$U_1$-phase winding 40, the delta-$U_2$-phase winding 43, the wye-$U_1$-phase winding 50, and the wye-$U_2$-phase winding 53 will be explained with reference to FIGS. 3 and 4. FIG. 3 is a rear-end end elevation that explains a method for mounting conductor wires that are mounted into a first slot group of a stator core that is used in the automotive alternator according to Embodiment 1 of the present invention, and FIG. 4 is a rear-end end elevation that explains a method for mounting conductor wires that are mounted into a second slot group of the stator core that is used in the automotive alternator according to Embodiment 1 of the present invention. Moreover, 1, 7, etc., through 67 in FIG. 3 represent slot numbers. 2, 8, etc., through 68 in FIG. 4 also represent slot numbers. In FIGS. 3 and 4, solid lines represent rear-end crossover portions, and broken lines are front-end crossover portions.

The stator core 21 is a laminated core that is formed into a cylindrical shape by laminating a predetermined number of core segments that are formed by punching thin magnetic steel plates into annular shapes, and integrating the laminated predetermined number of core segments by welding, for example. The stator core 21 has: an annular core back portion 21a; tooth portions 21b that each extend radially inward from an inner peripheral surface of the core back portion 21a, and that are arranged at a uniform angular pitch circumferentially; and slots 21c that are bounded by the core back portion 21a and adjacent tooth portions 21b.

Here, the number of claw-shaped magnetic poles in the pole core 10 of the rotor 8 is twelve, and the number of slots $21c$ is seventy-two. Specifically, the slots $21c$ are formed at a ratio of two slots per phase per pole, and at a uniform angular pitch circumferentially (a pitch corresponding to an electrical angle of $\pi/6$).

The delta-$U_1$-phase winding 40 and the wye-$U_1$-phase winding 50 are constituted by six first through sixth winding portions 31 through 36 that are formed by mounting conductor wires 30 into the stator core 21, and the delta-$U_2$-phase winding 43 and the wye-$U_2$-phase winding 53 are constituted by six first through sixth winding portions 31 through 36 that are formed by mounting conductor wires 30 into the stator core 21. Here, the conductor wires 30 are continuous wires that are constituted by a copper wire that is coated with an insulator.

First, first through sixth winding portions 31 through 36 that are mounted into a first slot group that is constituted by the slots 21c at intervals of six slots at Slot Numbers 1, 7, 13, etc., through 67, will be explained with reference to FIG. 3.

The first winding portion 31 is configured by winding a single conductor wire 30 into a wave winding at intervals of six slots from Slot Number 1 through Slot Number 67 so as to alternately occupy a first position from an inner circumferential side (hereinafter "Address 1") and a second position from the inner circumferential side (hereinafter "Address 2") inside the slots 21c. Then, the first winding portion 31 is configured into a single-turn wave winding by joining together by welding, etc., two end portions of the conductor wire 30 that extend out frontward from the slots 21c at Slot Numbers 1 and 67. The second winding portion 32 is configured by winding a single conductor wire 30 into a wave winding at intervals of six slots from Slot Number 1 through Slot Number 67 so as to alternately occupy Address 2 and Address 1 inside the slots 21c. Then, the second winding portion 32 is configured into a single-turn wave winding by joining together by welding, etc., two end portions of the conductor wire 30 that extend out rearward from the slots 21c at Slot Numbers 1 and 67.

The third winding portion 33 is configured by winding a single conductor wire 30 into a wave winding at intervals of six slots from Slot Number 1 through Slot Number 67 so as to alternately occupy a third position from the inner circumferential side (hereinafter "Address 3") and a fourth position from the inner circumferential side (hereinafter "Address 4") inside the slots 21c. Then, the third winding portion 33 is configured into a single-turn wave winding by joining together by welding, etc., two end portions of the conductor wire 30 that extend out frontward from the slots 21c at Slot Numbers 1 and 67. The fourth winding portion 34 is configured by winding a single conductor wire 30 into a wave winding at intervals of six slots from Slot Number 1 through Slot Number 67 so as to alternately occupy Address 4 and Address 3 inside the slots 21c. Then, the fourth winding portion 34 is configured into a single-turn wave winding by joining together by welding, etc., two end portions of the conductor wire 30 that extend out rearward from the slots 21c at Slot Numbers 1 and 67.

The fifth winding portion 35 is configured by winding a single conductor wire 30 into a wave winding at intervals of six slots from Slot Number 1 through Slot Number 67 so as to alternately occupy a fifth position from the inner circumferential side (hereinafter "Address 5") and a sixth position from the inner circumferential side (hereinafter "Address 6") inside the slots 21c. Then, the fifth winding portion 35 is configured into a single-turn wave winding by joining together by welding, etc., two end portions of the conductor wire 30 that extend out frontward from the slots 21c at Slot Numbers 1 and 67. The sixth winding portion 36 is configured by winding a single conductor wire 30 into a wave winding at intervals of six slots from Slot Number 1 through Slot Number 67 so as to alternately occupy Address 6 and Address 5 inside the slots 21c. Then, the sixth winding portion 36 is configured into a single-turn wave winding by joining together by welding, etc., two end portions of the conductor wire 30 that extend out rearward from the slots 21c at Slot Numbers 1 and 67.

Next, a crossover portion 30a of the first winding portion 31 that extends outward from the slots 21c at the rear end at Slot Number 25 and enters the slots 21c at Slot Number 31 is cut, and a crossover portion 30a of the second winding portion 32 that extends outward from the slots 21c at the rear end at Slot Number 31 and enters the slots 21c at Slot Number 37 is cut. Then, cut ends of the first and second winding portions 31 and 32 that extend out rearward from the slots 21c at Slot Number 31 are joined together by welding, etc. The first and second winding portions 31 and 32 are thereby connected in series to constitute the delta-$U_1$-phase winding 40.

Next, crossover portions 30a of the third and fifth winding portions 33 and 35 that extend out rearward from the slots 21c at Slot Number 37 and enter the slots 21c at Slot Number 43 are cut, and crossover portions 30a of the fourth and sixth winding portions 34 and 36 that extend out rearward from the slots 21c at Slot Number 43 and enter the slots 21c at Slot Number 49 are cut. Then, cut ends of the third and fifth winding portions 33 and 35 that extend out rearward from the slots 21c at Slot Number 37 are joined together by welding, etc., to constitute a two-turn winding portion. Cut ends of the fourth and sixth winding portions 34 and 36 that extend out rearward from the slots 21c at Slot Number 43 are similarly joined together by welding, etc., to constitute a two-turn winding portion. In addition, a cut end of the third winding portion 33 that extends out rearward from the slots 21c at Slot Number 43 and a cut end of the fourth winding portion 34 that extends out rearward from the slots 21c at Slot Number 49 are joined by welding, etc., and a cut end of the fifth winding portion 35 that extends out rearward from the slots 21c at Slot Number 43 and a cut end of the sixth winding portion 36 that extends out rearward from the slots 21c at Slot Number 49 are joined by welding, etc. The two-turn winding portion in which the third and fifth winding portions 33 and 35 are connected in series and the two-turn winding portion in which the fourth and sixth winding portions 34 and 36 are connected in series are thereby connected in parallel to configure the wye-$U_2$-phase winding 53.

Next, first through sixth winding portions 31 through 36 that are mounted into a second slot group that is constituted by the slots 21c at intervals of six slots at Slot Numbers 2, 8, 14, etc., through 68, will be explained with reference to FIG. 4.

The first winding portion 31 is configured by winding a single conductor wire 30 into a wave winding at intervals of six slots from Slot Number 2 through Slot Number 68 so as to alternately occupy Address 1 and Address 2 inside the slots 21c. Then, the first winding portion 31 is configured into a single-turn wave winding by joining together by welding, etc., two end portions of the conductor wire 30 that extend out frontward from the slots 21c at Slot Numbers 2 and 68. The second winding portion 32 is configured by winding a single conductor wire 30 into a wave winding at intervals of six slots from Slot Number 2 through Slot Number 68 so as to alternately occupy Address 2 and Address 1 inside the slots 21c. Then, the second winding portion 32 is configured into a single-turn wave winding by joining together by welding, etc., two end portions of the conductor wire 30 that extend out rearward from the slots 21c at Slot Numbers 2 and 68.

The third winding portion 33 is configured by winding a single conductor wire 30 into a wave winding at intervals of six slots from Slot Number 2 through Slot Number 68 so as to alternately occupy Address 3 and Address 4 inside the slots 21c. Then, the third winding portion 33 is configured into a single-turn wave winding by joining together by welding, etc., two end portions of the conductor wire 30 that extend out frontward from the slots 21c at Slot Numbers 2 and 68. The fourth winding portion 34 is configured by winding a single conductor wire 30 into a wave winding at intervals of six slots from Slot Number 2 through Slot Number 68 so as to alternately occupy Address 4 and Address 3 inside the slots 21c. Then, the fourth winding portion 34 is configured into a single-turn wave winding by joining together by welding, etc., two end portions of the conductor wire 30 that extend out rearward from the slots 21c at Slot Numbers 2 and 68.

The fifth winding portion 35 is configured by winding a single conductor wire 30 into a wave winding at intervals of six slots from Slot Number 2 through Slot Number 68 so as to alternately occupy Address 5 and Address 6 inside the slots 21c. Then, the fifth winding portion 35 is configured into a single-turn wave winding by joining together by welding, etc., two end portions of the conductor wire 30 that extend out frontward from the slots 21c at Slot Numbers 2 and 68. The sixth winding portion 36 is configured by winding a single conductor wire 30 into a wave winding at intervals of six slots from Slot Number 2 through Slot Number 68 so as to alternately occupy. Address 6 and Address 5 inside the slots 21c. Then, the sixth winding portion 36 is configured into a single-turn wave winding by joining together by welding, etc., two end portions of the conductor wire 30 that extend out rearward from the slots 21c at Slot Numbers 2 and 68.

Next, a crossover portion 30a of the first winding portion 31 that extends outward from the slots 21c at the rear end at Slot Number 26 and enters the slots 21c at Slot Number 32 is cut, and a crossover portion 30a of the second winding portion 32 that extends outward from the slots 21c at the rear end at Slot Number 32 and enters the slots 21c at Slot Number 38 is cut. Then, cut ends of the first and second winding portions 31 and 32 that extend out rearward from the slots 21c at Slot Number 32 are joined together by welding, etc. The first and second winding portions 31 and 32 are thereby connected in series to constitute the delta-$U_2$-phase winding 43.

Next, crossover portions 30a of the third and fifth winding portions 33 and 35 that extend out rearward from the slots 21c at Slot Number 38 and enter the slots 21c at Slot Number 44 are cut, and crossover portions 30a of the fourth and sixth winding portions 34 and 36 that extend out rearward from the slots 21c at Slot Number 44 and enter the slots 21c at Slot Number 50 are cut. Then, cut ends of the third and fifth winding portions 33 and 35 that extend out rearward from the slots 21c at Slot Number 38 are joined together by welding, etc., to constitute a two-turn winding portion. Cut ends of the fourth and sixth winding portions 34 and 36 that extend out rearward from the slots 21c at Slot Number 44 are similarly joined together by welding, etc., to constitute a two-turn winding portion. In addition, a cut end of the third winding portion 33 that extends out rearward from the slots 21c at Slot Number 44 and a cut end of the fourth winding portion 34 that extends out rearward from the slots 21c at Slot Number 50 are joined by welding, etc., and a cut end of the fifth winding portion 35 that extends out rearward from the slots 21c at Slot Number 44 and a cut end of the sixth winding portion 36 that extends out rearward from the slots 21c at Slot Number 50 are joined by welding, etc. The two-turn winding portion in which the third and fifth winding portions 33 and 35 are connected in series and the two-turn winding portion in which the fourth and sixth winding portions 34 and 36 are connected in series are thereby connected in parallel to configure the wye-$U_1$-phase winding 50.

Although not shown, first through sixth winding portions 31 through 36 are formed by similarly winding conductor wires 30 into a third slot group that is constituted by the slots 21c at intervals of six slots at Slot Numbers 3, 9, 15, etc., through 69. First through sixth winding portions 31 through 36 are also formed by similarly winding conductor wires 30 into a fourth slot group that is constituted by the slots 21c at intervals of six slots at Slot Numbers 4, 10, 16, etc., through 70. Then, the first through sixth winding portions 31 through 36 that are mounted into the third slot group and the first through sixth winding portions 31 through 36 that are mounted into the fourth slot-group are connected in a similar manner to configure the delta-$V_1$-phase winding 41, the delta-$V_2$-phase winding 44, the wye-$V_1$-phase winding 51, and the wye-$V_2$-phase winding 54.

Although not shown, first through sixth winding portions 31 through 36 are formed by similarly winding conductor wires 30 into a fifth slot group that is constituted by the slots 21c at intervals of six slots at Slot Numbers 5, 11, 17, etc., through 71. First through sixth winding portions 31 through 36 are also formed by similarly winding conductor wires 30 into a sixth slot group that is constituted by the slots 21c at intervals of six slots at Slot Numbers 6, 12, 18, etc., through 72. Then, the first through sixth winding portions 31 through 36 that are mounted into the fifth slot group and the first through sixth winding portions 31 through 36 that are mounted into the sixth slot group are connected in a similar manner to configure the delta-$W_1$-phase winding 42, the delta-$W_2$-phase winding 45, the wye-$W_1$phase winding 52, and the wye-$W_2$-phase winding 55.

The first delta winding is formed by delta-connecting the delta-$U_1$-phase winding 40, the delta-$V_1$-phase winding 41, and the delta-$W_1$-phase winding 42 that is configured in this manner. The first three-phase wye-delta hybrid winding 23 is formed by connecting the wye-$U_1$-phase winding 50, the wye-$V_1$-phase winding 51, and the wye-$W_1$-phase winding 52 to the respective output ends of the first delta winding.

The second delta winding is formed by delta-connecting the delta-$U_2$-phase winding 43, the delta-$V_2$-phase winding 44, and the delta-$W_2$-phase winding 45 that is configured in this manner. The second three-phase wye-delta hybrid winding 24 is formed by connecting the wye-$U_2$-phase winding 53, the wye-$V_2$-phase winding 54, and the wye-$W_2$-phase winding 55 to the respective output ends of the first delta winding.

Now, the delta-$U_1$-phase winding 40, the delta-$V_1$-phase winding 41, and the delta-$W_1$-phase winding 42 are each constituted by a two-turn winding portion. The wye-$U_1$-phase winding 50, the wye-$V_1$-phase winding 51, and the wye-$W_1$-phase winding 52 are each configured by connecting two-turn winding portions in parallel. Thus, the turn ratio between the delta-$U_1$-phase winding 40, the delta-$V_1$-phase winding 41, and the delta-$W_1$-phase winding 42 (the phase windings of the first delta winding) and the wye-$U_1$-phase winding 50, the wye-$V_1$-phase winding 51, and the wye-$W_1$-phase winding 52 (the phase windings of the first wye winding) is 1. The wye-$V_1$-phase winding 50, the wye-$V_1$-phase winding 51, and the wye-$W_1$-phase winding 52 have a phase difference that corresponds to an electrical angle of $\pi/6$ with respect to the delta-$U_1$-phase winding 40, the delta-$V_1$-phase winding 41, and the delta-$W_1$-phase winding 42.

The delta-$U_2$-phase winding 43, the delta-$V_2$-phase winding 44, and the delta-$W_2$-phase winding 45 are each constituted by a two-turn winding portion. The wye-$U_2$-phase winding 53, the wye-V₂-phase winding 54, and the wye-W₂-phase winding 55 are each configured by connecting two-turn winding portions in parallel. Thus, the turn ratio between the delta-U₂-phase winding 43, the delta-V₂-phase winding 44, and the delta-W₂-phase winding 45 (the phase windings of the second delta winding) and the wye-U₂-phase winding 53, the wye-V₂-phase winding 54, and the wye-W₂-phase winding 55 (the phase windings of the second wye winding) is 1. The wye-U₂-phase winding 53, the wye-V₂-phase winding 54, and the wye-W₂-phase winding 55 have a phase difference that corresponds to an electrical angle of n/6 with respect to the delta-U₂-phase winding 43, the delta-V₂-phase winding 44, and the delta-W₂-phase winding 45.

In addition, the delta-U₂-phase winding 43, the delta-V₂-phase winding 44, and the delta-W₂-phase winding 45 have a phase difference that corresponds to an electrical angle of $\pi/6$ with respect to the delta-U₁-phase winding 40, the delta-V₁-phase winding 41, and the delta-WI-phase winding 42. The wye-U₁-phase winding 50, the wye-V₁-phase winding 51, and the wye-W₁-phase winding 52 have a phase difference that corresponds to an electrical angle of $\pi/6$ with respect to the wye-U₂-phase winding 53, the wye-V₂-phase winding 54, and the wye-W₂-phase winding 55. Thus, the first three-phase wye-delta hybrid winding 23 and the second three-phase wye-delta hybrid winding 24 have a phase difference that corresponds to an electrical angle of $\pi/6$.

At the front end and the rear end of the stator core 21, the crossover portions 30a of the conductor wires 30 that extend outward from the slots 21c, fold back, and enter slots 21c that are six slots away form coil ends. Thus, at the front end and the rear end of the stator core 21, coil ends that are formed into almost identical shapes are arranged neatly circumferentially so as to form three rows radially to form coil end groups 22f and 22r.

Moreover, air intake apertures 2a and 3a are disposed on axial end surfaces of the front bracket 2 and the rear bracket 3, and air discharge apertures 2b and 3b are disposed on first and second outer circumferential shoulder portions of the front bracket 2 and the rear bracket 3 radially outside the front-end and rear-end coil end groups 22f and 22r of the stator winding 22.

In an automotive alternator 1 that is configured in this manner, a field current is supplied from a battery (not shown) through the brushes 13 and the slip rings 12 to the field coil 9 to generate magnetic flux. The claw-shaped magnetic poles of the pole core 10 are magnetized by this magnetic flux such that North-seeking (N) poles and South-seeking (5) poles alternate circumferentially.

At the same time, rotational torque from an engine is transferred to the shaft 6 by means of a belt (not shown) and the pulley 7 to rotate the rotor 8. Thus, rotating magnetic fields are applied to the stator winding 22 in the stator 20, generating electromotive forces in the first and second three-phase wye-delta hybrid alternating-current windings 23 and 24 of the stator winding 22. The alternating currents that are generated by these electromotive forces are rectified into direct current by the respective rectifiers 15, and magnitudes of output voltages therefrom are adjusted by the voltage regulator 16 and supplied to the battery, and to on-board electrical loads, etc.

The fans 11 are rotated together with the rotor 8. Thus, air is sucked inside the housing 4 through the air intake apertures 2a and 3a, flows axially toward the rotor 8, and is deflected centrifugally by the fans 11. The air that is deflected centrifugally passes through the cooling airflow channels that are inclined forward in the direction of rotation of the rotor 8, crosses the front-end and rear-end coil end groups 22f and 22r from a radially inner side to a radially outer side, and is discharged outside the housing 4 through the air discharge apertures 2b and 3b. Heat that is generated in the stator winding 22 is thereby radiated to the air from the front-end and rear-end coil end groups 22f and 22r, enabling temperature increases in the stator 20 to be suppressed.

According to Embodiment 1, the first delta winding and the first wye winding that constitute the first three-phase wye-delta hybrid winding 23 have a phase difference that corresponds to an electrical angle of $\pi/6$, and the second delta winding and the second wye winding that constitute the second three-phase wye-delta hybrid winding 24 have a phase difference that corresponds to an electrical angle of $\pi/6$. Thus, harmonic components of reactive magnetomotive forces of the stator 20 that are a major cause of magnetic noise can be canceled out by the first and second three-phase wye-delta hybrid windings 23 and 24, enabling magnetic noise to be reduced.

The phase windings that constitute the first wye winding and the second wye winding (the wye-U₁-phase winding 50, the wye-V₁-phase winding 51, the wye-W₁-phase winding 52, the wye-U₂-phase winding 53, the wye-V₂-phase winding 54, and the wye-W₂-phase winding 55) are configured into respective parallel circuits that are formed by connecting in parallel a winding portion that is formed by connecting the third winding portion 33 and the fifth winding portion 35 in series and a winding portion that is formed by connecting the fourth winding portion 34 and the sixth winding portion 36 in series. The third and fourth winding portions 33 and 34 are configured by winding conductor wires 30 so as to alternate between Address 3 and Address 4 of the slots 21c, and the fifth and sixth winding portions 35 and 36 are configured by winding conductor wires 30 so as to alternate between Address 5 and Address 6 of the slots 21c. Thus, in the pairs of winding portions that are connected in parallel, the distribution of radial positions inside the slots 21c of the conductor wires 30 that constitute the winding portions is equal. Thus, the inductance of the pairs of winding portions that are connected in parallel is equal, enabling the generation of cyclic currents in the parallel circuit portions to be suppressed.

Now, in wye-delta hybrid windings, electric currents that are √3 times the electric currents that flow through the respective phase windings that constitute the delta winding flow through the respective phase windings that constitute the wye winding.

Consequently, the density of the electric currents that flow through the phase windings that constitute the first wye winding is 0.866 times the density of the electric currents that flow through the phase windings that constitute the first delta winding.

Similarly, the density of the electric currents that flow through the phase windings that constitute the second wye winding is 0.866 times the density of the electric currents that flow through the phase windings that constitute the second delta winding.

Because the phase windings of the first and second wye windings are configured by connecting the two winding portions in parallel in this manner, the density of the electric currents that flow through the phase windings of the first and second delta windings and the density of the electric currents that flow through the phase windings of the first and second wye windings can be made approximately equal. Thus, the temperature distribution of the stator winding 22 can be made uniform.

The density of the electric currents that flow through the phase windings that constitute the first delta winding and the second delta winding is slightly larger than the density of the electric currents that flow through the phase windings that constitute the first wye winding and the second wye winding, and the amount of heat generated in the phase windings that constitute the first delta winding and the second delta winding is greater. However, the phase windings that constitute the first delta winding and the second delta winding are constituted by the first winding portions 31 and the second winding portions 32 that are formed by mounting conductor wires 30 so as to alternate between Address 1 and Address 2 of the slots 21c. Thus, the coil ends of the phase windings that constitute the first delta winding and the second delta winding are positioned on radially inner sides of the coil end groups 22f and 22r, and are exposed to air that is deflected centrifugally by the fans 11. Because heat that is generated in the phase windings that constitute the first delta winding and the second delta winding is thereby radiated effectively, the temperature distribution of the stator winding 22 is made more uniform.

Because the first through sixth winding portions 31 through 36 are formed using identical conductor wires 30, the coils can be shaped using a single tool, achieving rationalization of the manufacturing process, and the coil ends are also made uniform, enabling the generation of wind-splitting noise that results from unevenness of the coil end groups 22f and 22r to be suppressed.

End portions of four conductor wires 30 must be joined in connection portions between the phase windings that constitute the first delta winding and the second delta winding and the phase windings that constitute the first wye winding and the second wye winding. Means such as placing a ring body over bundled end portions and crimping that ring body to place the end portions in pressure contact with each other, twisting bundled end portions to place the end portions in pressure contact with each other, soldering together bundled end portions, or welding bundled end portions, for example, can be used as means for joining together the end portions of the four conductor wires 30. From the viewpoint of joining workability and joining strength, it is preferable to weld bundled end portions. By welding bundled end portions, axial heights of the connection portions are suppressed, the connecting operation is simplified, and joining strength is also increased, thereby improving reliability. Tungsten-inert gas (TIG) welding, for example, can be used as the welding method.

Moreover, in Embodiment 1 above, the phase windings of the first wye winding and the second wye winding are configured by connecting in parallel a winding portion in which a third winding portion and a fifth winding portion are connected in series and a winding portion in which a fourth winding portion and a sixth winding portion are connected in series. However, the two winding portions that are connected in parallel are not limited to a combination of the winding portion in which the third winding portion and the fifth winding portion are connected in series and the winding portion in which the fourth winding portion and the sixth winding portion are connected in series. In other words, in order to suppress the generation of cyclic currents in the parallel circuit portions, the inductance of the two winding portions should be approximately equal, and a combination of a winding portion in which the first winding portion and the third winding portion are connected in series and a winding portion in which the second winding portion and the fourth winding portion are connected in series, or a combination of a winding portion in which the first winding portion and the fifth winding portion are connected in series and a winding portion in which the second winding portion and the sixth winding portion are connected in series, for example, may also be used. In either case, the distribution of the radial positions inside the slots of the conductor wires that constitute the two winding portions is approximately equal, and the inductance of the two winding portions is approximately equal.

Figure 5:
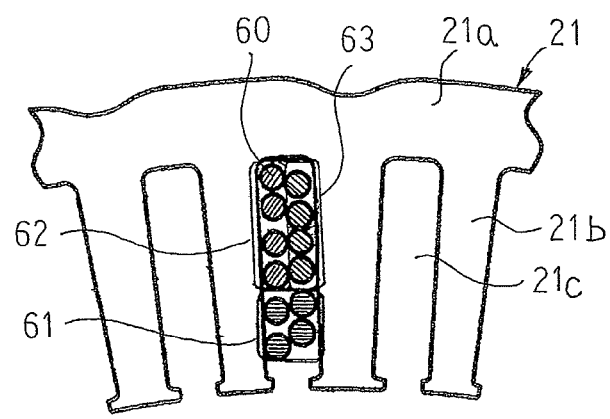
FIG. 5 is a diagram that explains one preferred variation of a stator winding mounting construction in the stator that can be used in the automotive alternator according to Embodiment 1 of the present invention.
Figure 6:
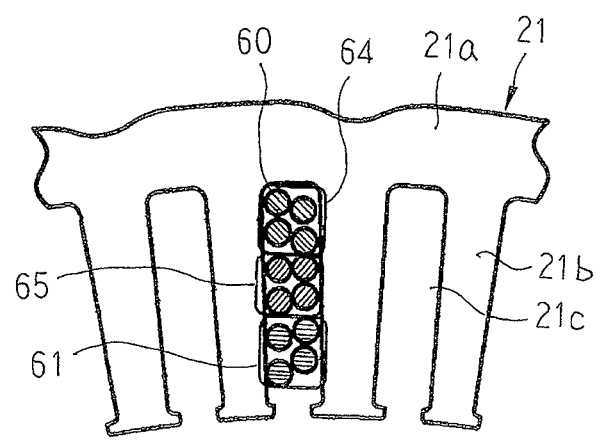
FIG. 6 is a diagram that explains another preferred variation of a stator winding mounting construction in the stator that can be used in the automotive alternator according to Embodiment 1 of the present invention.

In Embodiment 1 above, six conductor wires are housed inside one slot, but the number of conductor wires that are housed inside the slots is not limited to six. As shown in FIGS. 5 and 6, the number of conductor wires 60 that are housed inside the slots may also be twelve, for example.

In the case that is shown in FIG. 5, for example, a phase winding of a four-turn delta winding is configured using a radially inner group of four conductor wires 61. A phase winding of a four-turn wye winding is configured by connecting in parallel a four-turn winding portion that is formed using a group of four conductor wires 62 that are positioned radially outside on a first circumferential side, and a four-turn winding portion that is formed using a group of four conductor wires 63 that are positioned radially outside on a second circumferential side. In that case, the distribution of radial positions inside the slots of the conductor wires 60 that constitute the conductor wire groups 62 and 63 that constitute the two winding portions that are connected in parallel is also approximately equal. Thus, the inductance of the two winding portions that constitute the parallel circuit is approximately equal, suppressing the generation of cyclic currents in the parallel circuit portions.

In the case that is shown in FIG. 6, for example, a phase winding of a four-turn delta winding is configured using a radially inner group of four conductor wires 61. A phase winding of a four-turn wye winding is configured by connecting in parallel a four-turn winding portion that is formed using a group of four conductor wires 64 that are positioned radially outside, and a four-turn winding portion that is formed using a group of four conductor wires 65 that are positioned intermediately. In that case, the conductor wire groups 64 and 65 that constitute the two winding portions are also radially adjacent inside the slots. Thus, the inductance of the two winding portions that constitute the parallel circuit is close and approximately equal, suppressing the generation of cyclic currents in the parallel circuit portions.

Embodiment 2

Figure 7:
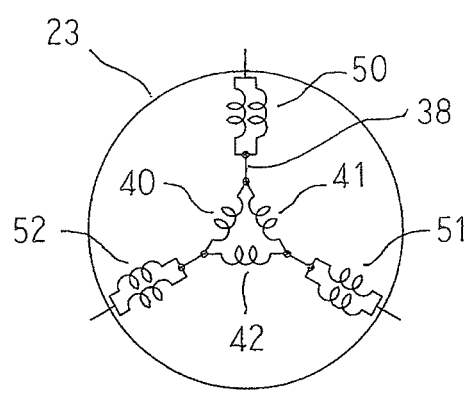
FIG. 7 is a schematic diagram that shows a connected state of a first three-phase wye-delta hybrid winding in an automotive alternator according to Embodiment 2 of the present invention.
Figure 8:
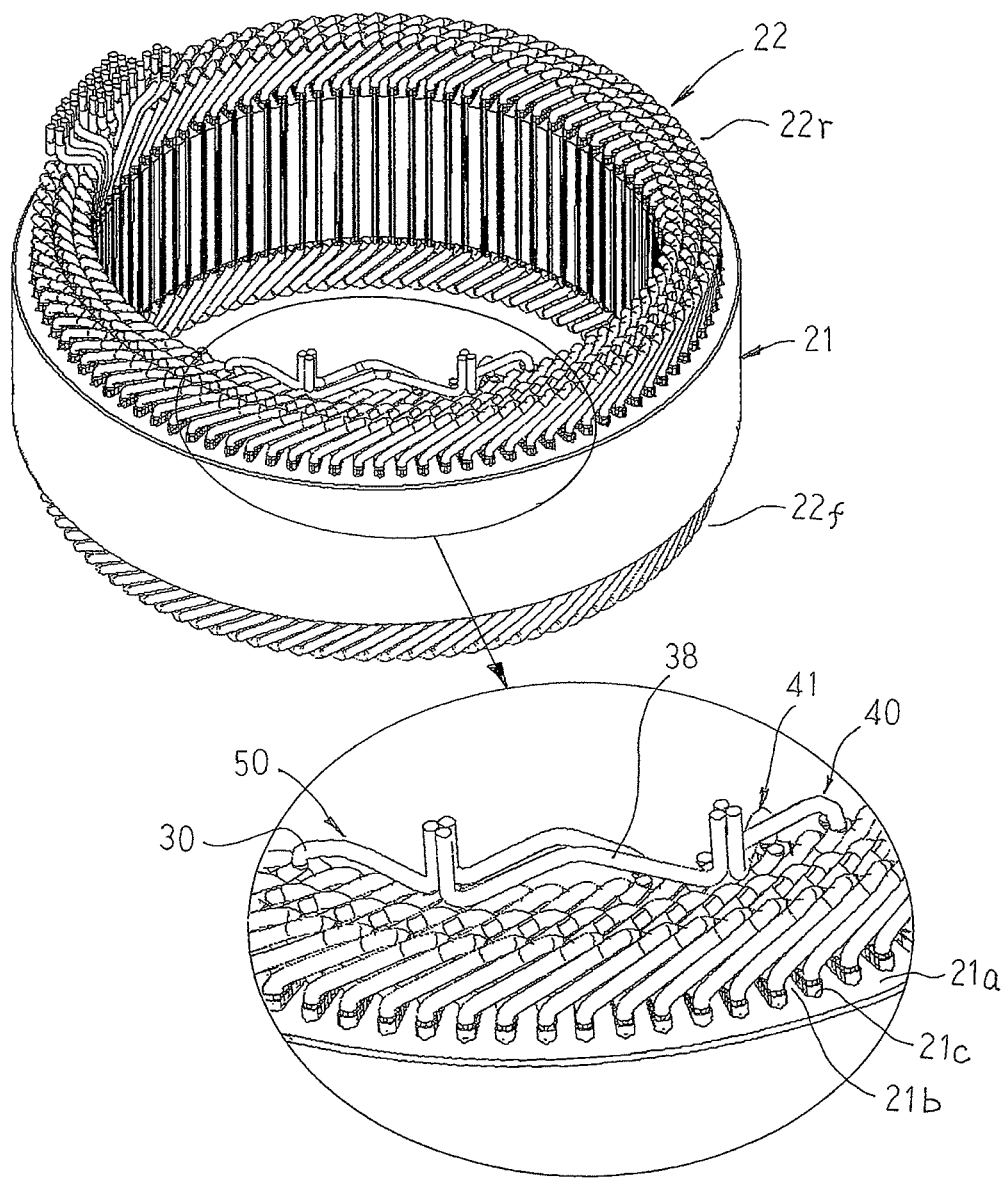
FIG. 8 is a perspective that shows a stator in the automotive alternator according to Embodiment 2 of the present invention.

FIG. 7 is a schematic diagram that shows a connected state of a first three-phase wye-delta hybrid winding in an automotive alternator according to Embodiment 2 of the present invention, and FIG. 8 is a perspective that shows a stator in the automotive alternator according to Embodiment 2 of the present invention. Moreover, in FIG. 8, to facilitate explanation, only a single connection portion between a phase winding that constitutes a first delta winding and a phase winding that constitutes a first wye winding is shown.

In FIGS. 7 and 8, an additional wire 38 is made of a copper wire that is coated with an insulator that is identical to the conductor wires 30, and is disposed so as to extend in a circumferential direction over the coil end groups 22r such that a first end thereof is joined by welding, etc., to end portions of two conductor wires 30 that constitute a connection portion between a delta-$U_1$-phase winding 40 and a delta-$V_1$-phase winding 41 and a second end thereof is joined by welding, etc., to end portions of two conductor wires 30 that constitute an end portion of a wye-$U_1$-phase winding 50. Other connection portions between the output ends of the first delta winding and the phase windings of a first wye winding and connection portions between output ends of a second delta winding and phase windings of a second wye winding are also joined using additional wires 38 in a similar manner, and explanation thereof will be omitted here.

Moreover, the rest of the configuration is configured in a similar manner to Embodiment 1 above.

According to Embodiment 2, because respective output ends of the first and second delta windings and respective phase windings of the first and second wye windings are connected using the additional wires 38 that extend circumferentially over the coil end group 22r, the number of connections, which was four in Embodiment 1 above, can be reduced to three, improving connection workability, and joining strength is increased, thereby improving reliability.

Moreover, in each of the above embodiments, output from first and second three-phase wye-delta hybrid windings is rectified by separate rectifiers, but first and second three-phase wye-delta hybrid windings may also be connected in parallel, and output therefrom rectified by a single rectifier.

In each of the above embodiments, explanations are given for automotive alternators, but the present invention is not limited to automotive alternators, and similar effects are also exhibited if the present invention is applied to automotive rotary electric machines such as automotive electric motors, automotive generator-motors, etc.

What is claimed is:

1. A rotary electric machine comprising:
  a rotor that is rotatably supported by a housing; and
  a stator comprising:
    a stator core in which slots are formed at a ratio of two slots per phase per pole; and
    a first three-phase wye-delta hybrid winding and a second three-phase wye-delta hybrid winding that are mounted into said stator core,
  said stator being supported by said housing so as to surround said rotor,
  wherein:
  said first three-phase wye-delta hybrid winding comprises:
    a first delta winding that is configured by delta-connecting a delta-$U_1$-phase winding, a delta-$V_1$-phase winding, and a delta-$W_1$-phase winding; and
    a first wye winding that is constituted by a wye-$U_1$-phase winding, a wye-$V_1$-phase winding, and a wye-$W_1$-phase winding that are connected to respective output ends of said first delta winding;
  said second three-phase wye-delta hybrid winding comprises:
    a second delta winding that is configured by delta-connecting a delta-$U_2$-phase winding, a delta-$V_2$-phase winding, and a delta-$W_2$-phase winding; and
    a second wye winding that is constituted by a wye-$U_2$-phase winding, a wye-$V_2$-phase winding, and a wye-$W_2$-phase winding that are connected to respective output ends of said second delta winding;
  said delta-$U_1$-phase winding and said wye-$U_2$-phase winding are mounted into a first slot group that is constituted by said slots at intervals of six slots;
  said delta-$U_2$-phase winding and said wye-$U_1$-phase winding are mounted into a second slot group that is constituted by said slots at intervals of six slots;
  said delta-$V_1$-phase winding and said wye-$V_2$-phase winding are mounted into a third slot group that is constituted by said slots at intervals of six slots;
  said delta-$V_2$-phase winding and said wye-$V_1$-phase winding are mounted into a fourth slot group that is constituted by said slots at intervals of six slots;
  said delta-$W_1$-phase winding and said wye-$W_2$-phase winding are mounted into a fifth slot group that is constituted by said slots at intervals of six slots;
  said delta-$W_2$-phase winding and said wye-$W_1$-phase winding are mounted into a sixth slot group that is constituted by said slots at intervals of six slots;
  said delta-$U_1$-phase winding, said delta-$U_2$-phase winding, said delta-$V_1$-phase winding, said delta-$V_2$-phase winding, said delta-$W_1$-phase winding, said delta-$W_2$-phase winding, said wye-$U_1$-phase winding, said wye-$U_2$-phase winding, said wye-$V_1$-phase winding, said wye-$V_2$-phase winding, said wye-$W_1$-phase winding, and said wye-$W_2$-phase winding are respectively configured by winding conductor wires that have an identical cross-sectional shape into said slots at intervals of six slots;
  said wye-$U_1$-phase winding, said wye-$U_2$-phase winding, said wye-$V_1$-phase winding, said wye-$V_2$-phase winding, said wye-$W_1$-phase winding, and said wye-$W_2$-phase winding are each configured by connecting two winding portions in parallel; and
  said two winding portions that are connected in parallel are respectively configured by winding said conductor wires into said slots such that inductances of said two winding portions are close,
  wherein a first portion of the two winding portions connected in parallel comprises a first group of conductor wires positioned radially outside on a first circumferential side of said slots, and
  wherein a second portion of the two wiring portions connected in parallel comprises a second group of conductor wires positioned radially outside on a second circumferential side of said slots.

2. The rotary electric machine according to claim 1, wherein respective output ends of said first delta winding and respective phase windings that constitute said first wye winding are connected by welding, and respective output ends of said second delta winding and respective phase windings that constitute said second wye winding are connected by welding.

3. The rotary electric machine according to claim 1, wherein respective output ends of said first delta winding and respective phase windings that constitute said first wye winding are connected by means of an additional wire, and respective output ends of said second delta winding and respective phase windings that constitute said second wye winding are connected by means of an additional wire.

4. A rotary electric machine comprising:
  a rotor that is rotatably supported by a housing; and
  a stator comprising:
    a stator core in which slots are formed at a ratio of two slots per phase per pole; and
    a first three-phase wye-delta hybrid winding and a second three-phase wye-delta hybrid winding that are mounted into said stator core,
  said stator being supported by said housing so as to surround said rotor,
  wherein:
  said first three-phase wye-delta hybrid winding comprises:
    a first delta winding that is configured by delta-connecting a delta-$U_1$-phase winding, a delta-$V_1$-phase winding, and a delta-$V_1$-phase winding; and
    a delta-$W_1$-phase winding; and
    a first wye winding that is constituted by a wye-$U_1$-phase winding, a wye-$V_1$-phase winding, and a wye-$W_1$-phase winding that are connected to respective output ends of said first delta winding;
  said second three-phase wye-delta hybrid winding comprises:
    a second delta winding that is configured by delta-connecting a delta-$U_2$-phase winding, a delta-$V_2$-phase winding, and a delta-$W_2$-phase winding; and a second wye winding that is constituted by a wye-$U_2$-phase winding, a wye-$V_2$-phase winding, and a wye-$W_2$-phase winding that are connected to respective output ends of said second delta winding;

said delta-$U_1$-phase winding and said wye-$U_2$-phase winding are mounted into a first slot group that is constituted by said slots at intervals of six slots;

said delta-$U_2$-phase winding and said wye-$U_1$-phase winding are mounted into a second slot group that is constituted by said slots at intervals of six slots;

said delta-$V_1$-phase winding and said wye-$V_2$-phase winding are mounted into a third slot group that is constituted by said slots at intervals of six slots;

said delta-$V_2$-phase winding and said wye-$V_1$-phase winding are mounted into a fourth slot group that is constituted by said slots at intervals of six slots;

said delta-$W_1$-phase winding and said wye-$W_2$-phase winding are mounted into a fifth slot group that is constituted by said slots at intervals of six slots;

said delta-$W_2$-phase winding and said wye-$W_1$-phase winding are mounted into a sixth slot group that is constituted by said slots at intervals of six slots;

said delta-$U_1$-phase winding, said delta-$U_2$-phase winding, said delta-$V_1$-phase winding, said delta-$V_2$-phase winding, said delta-$W_1$-phase winding, said delta-$W_2$-phase winding, said wye-$U_1$-phase winding, said wye-$U_2$-phase winding, said wye-$V_1$-phase winding, said wye-$V_2$-phase winding, said wye-$W_1$-phase winding, and said wye-$W_2$-phase winding are respectively configured by winding conductor wires that have an identical cross-sectional shape into said slots at intervals of six slots;

said wye-$U_1$-phase winding, said wye-$U_2$-phase winding, said wye-$V_1$-phase winding, said wye-$V_2$-phase winding, said wye-$W_1$-phase winding, and said wye-$W_2$-phase winding are each configured by connecting two winding portions in parallel; and said two winding portions that are connected in parallel are respectively configured by winding said conductor wires into said slots such that inductances of said two winding portions are close, wherein respective output ends of said first delta winding and respective phase windings that constitute said first wye winding are connected by means of an additional wire, and respective output ends of said second delta winding and respective phase windings that constitute said second wye winding are connected by means of an additional wire.

* * * * *